(12) United States Patent
Jang et al.

(10) Patent No.: US 7,176,995 B2
(45) Date of Patent: Feb. 13, 2007

(54) REFLECTIVE PLATE OF LCD AND FABRICATION METHOD THEREOF

(75) Inventors: Sang Min Jang, Anyang-si (KR); Su Seok Choi, Henam-si (KR); Hee Yeong Ryu, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 77 days.

(21) Appl. No.: 10/689,625

(22) Filed: Oct. 22, 2003

(65) Prior Publication Data

US 2004/0125287 A1 Jul. 1, 2004

(30) Foreign Application Priority Data

Dec. 31, 2002 (KR) .................... 10-2002-0088096

(51) Int. Cl.
*G02F 1/1335* (2006.01)
*G02B 13/20* (2006.01)
*G02B 5/02* (2006.01)

(52) U.S. Cl. .................. 349/113; 349/67; 349/114; 359/599

(58) Field of Classification Search ............... 349/113, 349/114, 67; 359/599
See application file for complete search history.

(56) References Cited

U.S. PATENT DOCUMENTS

| 5,408,345 | A | * | 4/1995 | Mitsui et al. ............... 349/42 |
| 5,936,688 | A | * | 8/1999 | Tsuda et al. ............... 349/113 |
| 5,973,843 | A | * | 10/1999 | Nakamura ................ 359/619 |
| 6,407,784 | B1 | * | 6/2002 | Kanou et al. .............. 349/113 |
| 6,452,653 | B1 | * | 9/2002 | Yamanaka et al. ......... 349/113 |
| 6,747,718 | B2 | * | 6/2004 | Kanou et al. .............. 349/113 |
| 6,765,637 | B2 | * | 7/2004 | Takenaka .................. 349/113 |
| 6,784,957 | B2 | * | 8/2004 | Kanou et al. .............. 349/113 |
| 6,862,057 | B2 | * | 3/2005 | Sakamoto et al. ......... 349/113 |

* cited by examiner

*Primary Examiner*—Huyen Ngo
(74) *Attorney, Agent, or Firm*—McKenna Long & Aldridge LLP

(57) ABSTRACT

A reflective plate used in a liquid crystal display including a substrate, a first peak and depression layer of organic insulator on the substrate, a second peak and depression layer of organic insulator overlapping with the first peak and depression layer, and a reflective layer on the first and second peak and depression layers.

14 Claims, 15 Drawing Sheets

REFLECTIVE PLATE OF LCD AND FABRICATION METHOD THEREOF

This application claims the benefit of Korean Patent Application No. 2002-88096, filed on Dec. 31, 2002, which is hereby incorporated by reference for all purposes as if fully set forth herein.

BACKGROUND OF THE INVENTION

1. Field of the Invention

The present invention relates to a liquid crystal display (LCD), and more particularly, to a reflective plate having a peak and depression structure to enhance optical efficiency of an LCD and a fabrication method thereof.

2. Description of the Related Art

In general, the cathode ray tube (CRT) has been the most popular display device but it is very inconvenient to use because of its large size and heavy weight as compared to display area.

Accordingly, a thin flat panel display was developed which can be installed and used anywhere due to its thinness despite its large display area. The thin flat panel display is being substituted for the CRT, especially, a thin film transistor liquid crystal display (TFT-LCD). The TFT-LCD has a better resolution than other display devices and a response speed as fast as a CRT in displaying a moving picture.

The operation of such a TFT-LCD will be described briefly. When a pixel is switched by a thin film transistor, the switched pixel controls the light transmittance of a lower light source. Most switching elements are amorphous silicon thin film transistors (a-Si:H TFT) whose semiconductor layer is formed of amorphous silicon. This is because that the amorphous silicon thin film can be formed at a low temperature on a large insulating substrate such as an inexpensive glass substrate.

A general LCD operates such that an image is displayed using the light generated from a light source called backlight. However, such an LCD is a very inefficient optical modulator in that only 3 to 8% of the light that is incident from the backlight is transmitted. When it is assumed that the transmittance of two polarizing plates provided on an upper plate and a lower plate of the LCD is 45%; the transmittance of two glass substrates of the upper plate and the lower plate is 94%; the aperture ratio of the TFT array and the pixel is 65%; the transmittance of a color filter is 27%, the overall light transmittance of the LCD is calculated to be about 7.4%. Similarly, because the actual light power emitted from the LCD display image is merely about 7% of the light power emitted from the backlight, the backlight power should be increased as much as needed to achieve a high luminance LCD. As a result, the backlight needs more power. Thus, when an LCD is employed in a portable apparatus such as a notebook computer or a mobile communication terminal, a battery has been used to provide sufficient backlight power.

However, the use of a battery increases the weight of the portable device, for instance, a notebook computer or a mobile communication terminal, and also has a limitation that it cannot be used for a long time. To overcome this problem, reflective LCDs have been studied in which a backlight is not employed.

The reflective LCD is structured to reflect external light by substituting opaque reflective material for the pixel electrodes formed of transparent electrodes in a conventional transmissive LCD. As a result, because the reflective LCD is operated only using natural light without any backlight, the power consumed by a backlight is saved and the reflective LCD may be used for a long time on battery power. The aperture ratio of the reflective LCD is better than the conventional LCD employing a backlight.

Meanwhile, a user may use the reflective LCD where there is not enough natural light or artificial light. In other words, the reflective LCD can be used where natural light may be used or in an office in which artificial light may be used, but it cannot be used in a dark environment in which there is no natural light.

Therefore, recently, a transflective LCD that combines the advantage of a reflective LCD using ambient light and the advantage of a transparent LCD using a backlight has been studied and researched.

Referring to FIGS. 1 and 2, the configuration and fabrication process of a conventional reflective LCD will be described.

FIG. 1 illustrates a plan view of a conventional reflective LCD schematically and FIG. 2 illustrates a cross-sectional view of the thin film transistor area of the LCD taken along the line I—I of FIG. 1 schematically.

Here, FIG. 1 shows only a lower substrate on which the thin film transistor and the pixel region are prepared. FIG. 2 also shows an upper substrate having a color filter with the lower substrate of the reflective LCD.

A plurality of data lines 156 for applying data signals to a source electrode 161 and a plurality of gate lines 155 for applying gate signals to a gate electrode 121 are arranged in a matrix configuration on a glass substrate 111 of the lower substrate of the conventional reflective LCD. Regions defined by the crossing of the data lines 156 and the gate lines 155 correspond to pixel regions for displaying images. In the reflective LCD, a pixel electrode 181 serving as a reflective plate is formed on the pixel region.

As shown in FIG. 2, a gate electrode 121 of conductive material such as metal is formed on the transparent glass substrate 111. A gate insulating layer 130 of silicon nitride (SiNx) or silicon oxide (SiOx) covers the gate electrode 121. On the gate insulating layer 130 covering the gate electrode 121, an active layer 141 of amorphous silicon is formed. On the active layer 141, an ohmic contact layer 151, 152 of impurity-doped amorphous silicon is formed. On the ohmic contact layer 151, 152, source and drain electrodes 161 and 162 of conductive material such as metal are formed. The source and drain electrodes 161 and 162 form a thin film transistor (T) together with the gate electrode 121.

On the source and drain electrodes 161 and 162, a passivation layer 170 of silicon nitride (SiNx), silicon oxide (SiOx), or organic insulator is formed. The passivation layer 170 has a contact hole 171 exposing the drain electrode 162. The passivation layer 170 may be formed by sequentially depositing a first passivation film of SiNx or the like and a second passivation film of BCB or the like.

On the pixel region of the passivation layer 170, a pixel electrode 181 of transparent conductive material may be formed. The pixel electrode 181 may be connected with the drain electrode 162 through the contact hole formed in the passivation layer 170. The pixel electrode 181 also serves as a reflective plate so as to display an image. Although not shown in the drawings, on the pixel electrode 181, an alignment layer of material such as polyimide aligned in a predetermined direction may be formed.

Here, the gate electrode 121 may be connected with the gate line 155, and the source electrode 161 may be connected with the data line 156. The gate line 155 may be arranged substantially perpendicular with the data line 156 to define the pixel region.

Over the lower substrate having the aforementioned structure, an upper substrate may be arranged with a predetermined interval. The upper substrate includes a black matrix 120 formed to correspond to the thin film transistor of the lower substrate, to prevent light from leaking in areas other than the pixel region.

Below the black matrix 120, a color filter 131 of red (R), green (G) and blue (B) is sequentially and repeatedly formed. In the color filter 131, one color corresponds to one pixel region. The color filter 131 may be formed by a dying method, a printing method, a pigment dispersion method, an electrodeposition method, or the like.

Afterwards, below the color filter 131, a common electrode 140 made of transparent conductive material may be formed. Below the common electrode 140, a second alignment layer (not shown) made of material such as polyimide having an alignment surface aligned in a predetermined direction may be formed.

In the general reflective LCD configured as described above, the light that is incident through the upper substrate passes through liquid crystal layer 190, is reflected by the reflecting surface, passes through the liquid crystal layer 190 and the upper substrate sequentially, and exits the LCD.

In the conventional reflective LCD as described above, the light that is incident into the device from an external light source situated at a predetermined direction is reflected to the side opposite to the light source so that the viewing angle becomes narrower.

FIG. 3 is a graph illustrating the variation in reflection intensity versus the reflecting angle when a reflective plate is formed as a flat mirror without a scattering layer in the conventional LCD. The maximum reflection intensity may be found at a reflection angle of 30° with respect to the light that is incident at an incident angle of −30°. The plate shows that the maximum reflection intensity appears at about 30° when viewed with reference to a reflecting surface contacting with the liquid crystal layer. This is because the light with an incident angle of 30° enters into the LCD that has a high refraction unlike air and thus the light is refracted. The light refracted in the LCD is reflected by the mirror reflecting surface and reflected and outputted at the same reflection angle as the incident angle. The reflection angle is considered to be 30° because the incident angle is considered to be 30° in the general reflective LCD. The light that is incident from the side is reflected at an output angle of 30° in the opposite direction with the incident angle with respect to a normal direction.

Accordingly, because the reflected light cannot be found at the front reflection angles (output angle of 0° to 10°) the conventional reflective LCD having a mirror reflecting surface cannot function as a display device. Accordingly, there is a need for technologies to direct the reflected light toward the front main viewing environment of the user. Peaks and depressions are formed on the reflecting surface of the conventional general reflective LCD in order to scatter the reflected light in various directions.

FIG. 4 is a schematic plan view of a reflective LCD having a reflective plate with a peak and depression structure and FIG. 5 is a sectional view taken along the line II—II of FIG. 4 and shows a thin film transistor region of the reflective LCD;

FIG. 4 shows a lower substrate on which the thin film transistor and the pixel region are prepared. FIG. 5 shows also an upper substrate having a color filter with the lower substrate of the reflective LCD.

A plurality of data lines 256 applying a data signal to a source electrode 261 and a plurality of gate lines 255 applying a gate signal to a gate electrode 221 are formed in matrix on a glass substrate 211 on the lower substrate of the conventional reflective LCD. An area made by the crossing of the data lines 256 and the gate lines 255 becomes a pixel region to display an image. In a reflective LCD, a pixel electrode 281 with a structure of peaks and depressions that serves as a reflective plate is formed on this pixel region.

As shown in FIG. 5, a gate electrode 221 made of conductive material such as metal is formed on a transparent glass substrate 211 and a gate insulating layer 230 made of silicon nitride (SiNx) film or a silicon oxide (SiOx) film covers the gate electrode 221. An active layer 241 made of amorphous silicon is formed on the gate insulating film 230 of the gate electrode 221. An ohmic contact layer 251 and 252 made of impurity-doped amorphous silicon is next formed thereon. Source and drain electrodes 261 and 262 made of conductive material such as metal are formed on the ohmic contact layer 251 and 252, and the source and drain electrodes 261 and 262 form a thin film transistor T with the gate electrode 221.

A passivation layer 270 made of a silicon nitride (SiNx) film, a silicon oxide (SiOx) film or an organic insulator is formed on the source and drain electrodes 261 and 262, and the passivation layer 270 has a contact hole 271 to expose the drain electrode 262.

A pixel electrode 281 made of transparent conductive material is formed on the pixel region of the upper portion of the passivation layer 270, and the pixel electrode 281 is connected to the drain electrode 262 through a contact hole 271. To display an image in a reflective LCD, the pixel electrode 281 serves as a reflecting surface. The gate electrode 221 is connected to a gate line 255, and the source electrode 261 is connected to a data line 256. The gate line 255 and the data line 256 are substantially parallel to each other to define pixel region.

An upper substrate is formed above the lower substrate configured as described above and spaced from the lower substrate. A black matrix 220 is formed on the upper substrate corresponding to the portion of the thin film transistor under the transparent glass substrate 210 to prevent light from leaking in an area other than pixel region.

A color filter 231 is formed under the black matrix 220 and three colors red, green and blue are formed in order on the color filter 231. One color corresponds to one pixel region.

Subsequently, a common electrode 240 made of transparent conductive material is formed on the lower portion of the color filter 231. A second alignment layer which is made of material such as polyimide and whose surface is aligned in some direction is formed on the lower portion of the common electrode 240 (not shown).

In the general reflective LCD configured as described above, the light that is incident through the upper substrate passes through the liquid crystal layer 290, is reflected by the reflecting surface, and passes the liquid crystal layer 290 and the upper substrate successively exits the LCD. On the pixel region of the reflective LCD configured as above, the reflective plate with a peak and depression structure is formed. When the reflective plate of the reflective LCD is formed with a peak and depression structure 282, the pattern of the peak and depression structure 282 may be formed in a regular configuration or in an irregular configuration in another embodiment.

When the incident light from outside the LCD is reflected and projected by the peak and depression structure 282 of the reflecting surface formed on the pixel region of the reflective LCD, the incident light can be reflected with various angles due to the peak and depression structure 282 so that light scattering is induced.

FIGS. 6 and 7 are schematic partial sectional views illustrating the light scattering effect in the reflective LCD that has a reflective plate with the peak and depression structure. If light is incident from the side of the LCD with a predetermined incident angle (generally about 30°), the incident light is refracted due to a refraction index difference between the liquid crystal layer and air while passing through the liquid crystal layer. The refracted light is reflected diffusively by the reflecting surface of the peak and depression structure, passes through the liquid crystal layer and the upper substrate successively, and then exits the LCD.

The light reflected out of the LCD is not limited to reflections to the opposite side of the LCD, but the light is reflected in various directions so that the improved reflection intensity can be obtained at the front side that is the typical user location.

Referring to FIG. 7, with a viewing angle range between 0° and 10° to the normal direction that is the typical viewing angle of the user, the light that is incident from the outside with an incident angle of 30° is diffusively reflected by the reflecting surface of the peak and depression structure. The refraction index of air is $n1=1.0$ and the refraction index of the LCD is $n2=1.5$.

FIGS. 8A and 8B are a graph illustrating reflection intensity versus the reflection angle of the reflective LCD that has a conventional mirror type reflective plate and a graph illustrating reflection intensity versus the reflection angle of the reflective LCD that has a conventional reflecting surface with a peak and depression structure, respectively.

In FIG. 8A, the reflection intensity has a maximum value at the reflection angle of about 30° with respect to light that is incident with an incident angle of 30°. This is because light with an incident angle of about 30° enters into the LCD that has a high refraction index unlike air. The light refracted in the LCD is reflected by the mirror type reflecting surface and exits from the LCD with a reflection angle that is the same as the incident angle. Accordingly, the reflected light cannot be emitted at the front reflection angles (output angle 0–10°) corresponding to the typical main user location.

FIG. 8B is a graph illustrating the reflection intensity versus the reflection angle of the reflective LCD that has a conventional reflecting surface with the peak and depression structure. Comparing this with the reflection intensity characteristic of the mirror type reflecting surface described above, the reflective LCD has some amount of reflection intensity at a front reflection angle of about 0° to about 10° corresponding to the typical user location.

Here, integration ratios of the functions in the graphs of FIGS. 8A and 8B are the same as each other. The factor to determine the characteristic of the graph is in the peak and depression structure of the reflecting surface to allow the light that is incident to be scattered in various angles by the light scattering effect.

Accordingly, for efficient light reflection of the reflecting surface, it is desirable to make the reflecting surface have the structure of peaks and depressions. An embodiment of forming the reflecting surface will be described referring to FIGS. 9 and 10.

FIGS. 9A through 9D show schematically a peak and depression formation method using a one-layer process to form a reflective plate of a reflective LCD that has a conventional reflecting surface with the peak and depression structure.

Referring to FIG. 9A, first, the substrate 300 is coated with a photosensitive resin film 310 (for example, polymer resin) to form the peak and depression structure using a process such as a spin coating, a roll coating, or the like.

As shown in FIG. 9B, a diffraction mask 320 that has a plurality of slits formed at predetermined locations is aligned over the photosensitive resin film 310, and ultraviolet radiation (denoted by arrows on the drawings) is irradiated from above.

As shown in FIG. 9C, when developing the photosensitive resin film 310 the peaks and depressions have a height difference due to the photosensitive resin film 310 being exposed at different exposure intensities due to the diffraction mask 320. This results in a plurality of peak patterns 330 on the substrate 300.

Through a curing bake process, the plurality of peak patterns 330 of the photosensitive resin film are softened. During the softening process, the thick upper portion is melted and flows down to finally form hemi-spherical peaks 340 as shown in FIG. 9D.

However, the one-layer processing method as described above has a precision problem with the exposure method and exposure mask.

According to recent research, the optimal front reflection ratio may be obtained when a ratio of height to radius of the finally formed peak is 1:10 more or less and the radius of the peak is formed at 4~5 µm more or less.

However, in the reflective LCD of the one-layer process method, if the peak pattern of the reflecting surface is about 5 µm, because the height of the peak and depression should be controlled to be 0.5 µm, the process margin is very little.

When the peak and depression pattern is formed randomly to avoid the interference of light generated between peaks while the light is reflected in the process, the gap between the peaks is generated due to the random arrangement and the density of the peaks is lowered.

When forming the peaks of the reflecting surface as described above, the peak scatters light due to the unevenness of the hemi-spherical surface to the external incident light. However, because the portion between the peaks is flat, there still exists a problem that reflection intensity is high only in a specific direction.

To overcome the disadvantages of special exposure such as diffraction exposure, there are methods as reflecting surface formation method.

FIGS. 10A through 10E show schematically a peak and depression formation using a two-layer method to form a reflecting surface of a reflective LCD that has a conventional reflecting surface with the peak and depression structure.

Referring to FIG. 10A, first, the substrate 400 is formed with a photosensitive resin film 410 (for example, polymer resin) to form the peak and depression structure using the method such as spin coating, roll coating, or the like. The thickness of the photosensitive resin film 410 is 2 to 3 µm.

As shown in FIG. 10B, a diffraction mask 420 that has a plurality of slits formed at predetermined locations is aligned over the photosensitive resin film 410, and ultraviolet radiation (denoted by arrows on the drawings) is irradiated from above.

As shown in FIG. 10C, when developing the photosensitive resin film 410 the peaks and depressions have a height difference due to the photosensitive resin film 410 being exposed at different exposure intensities due to the diffraction mask 420. This results in a plurality of peak patterns 430 on the substrate 400.

Subsequently, through the curing bake process, the plurality of peak patterns 430 of the photosensitive resin film are softened to form curved hemi-spherical patterns 440 of peaks and depressions as shown in FIG. 10D. The photosensitive resin film peak and depression pattern 430 can be implemented to have different heights.

If photo acryl is coated on the peak and depression pattern formed by the process and hardened, as shown in FIG. 1E, the photo acryl layer 460 flows along the curve of the peaks and depressions, fills the depressions and finally decreases the height difference between the peaks and depressions so that the desired peak and depression structure is formed. However, the two-layer process is sensitive to the thermal characteristic of the second formed acryl layer.

When the peak and depression pattern is formed randomly to avoid the interference of the light generated between peaks and depressions while the light is reflected in the process, the gap between the peaks is generated due to the random arrangement and the density of the peaks is lowered. Therefore the reflection efficiency is lowered.

SUMMARY OF THE INVENTION

Accordingly, the present invention is directed to a reflective plate and fabrication method thereof that substantially obviates one or more problems due to limitations and disadvantages of the related art.

An advantage of the present invention is to provide a reflective plate of a reflective or transflective LCD and fabrication method thereof in which a reflecting surface of the reflective plate having a peak and depression surface is formed to have a maximum peak and depression density so that light efficiency and reflection efficiency of the reflecting surface are increased and a first peak and depression layer is formed in a random structure and a second peak and depression layer is formed between the first peak and depression layer.

Additional features and advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

To achieve these and other advantages and in accordance with the purpose of the invention, as embodied and broadly described, there is provided a method for fabricating a reflective plate used in a liquid crystal display including depositing a first organic insulating layer on a substrate, forming a first peak and depression layer in the first organic insulating layer by using a first mask, depositing a second organic insulating layer on the first peak and depression layer, forming a second peak and depression layer in the second organic insulating layer by using a second mask, and forming a reflective electrode on the first and second peak and depression layers.

In another aspect of the present invention, there is provided a reflective plate used in a liquid crystal display including a substrate, a first peak and depression layer of organic insulator on the substrate, a second peak and depression layer of organic insulator overlapping with the first peak and depression layer, and a reflective layer on the first and second peak and depression layers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principle of the invention.

In the drawings.

DETAILED DESCRIPTION OF THE INVENTION

Reference will now be made in detail to an embodiment of the present invention, example of which is illustrated in the accompanying drawings.

Figure 1:
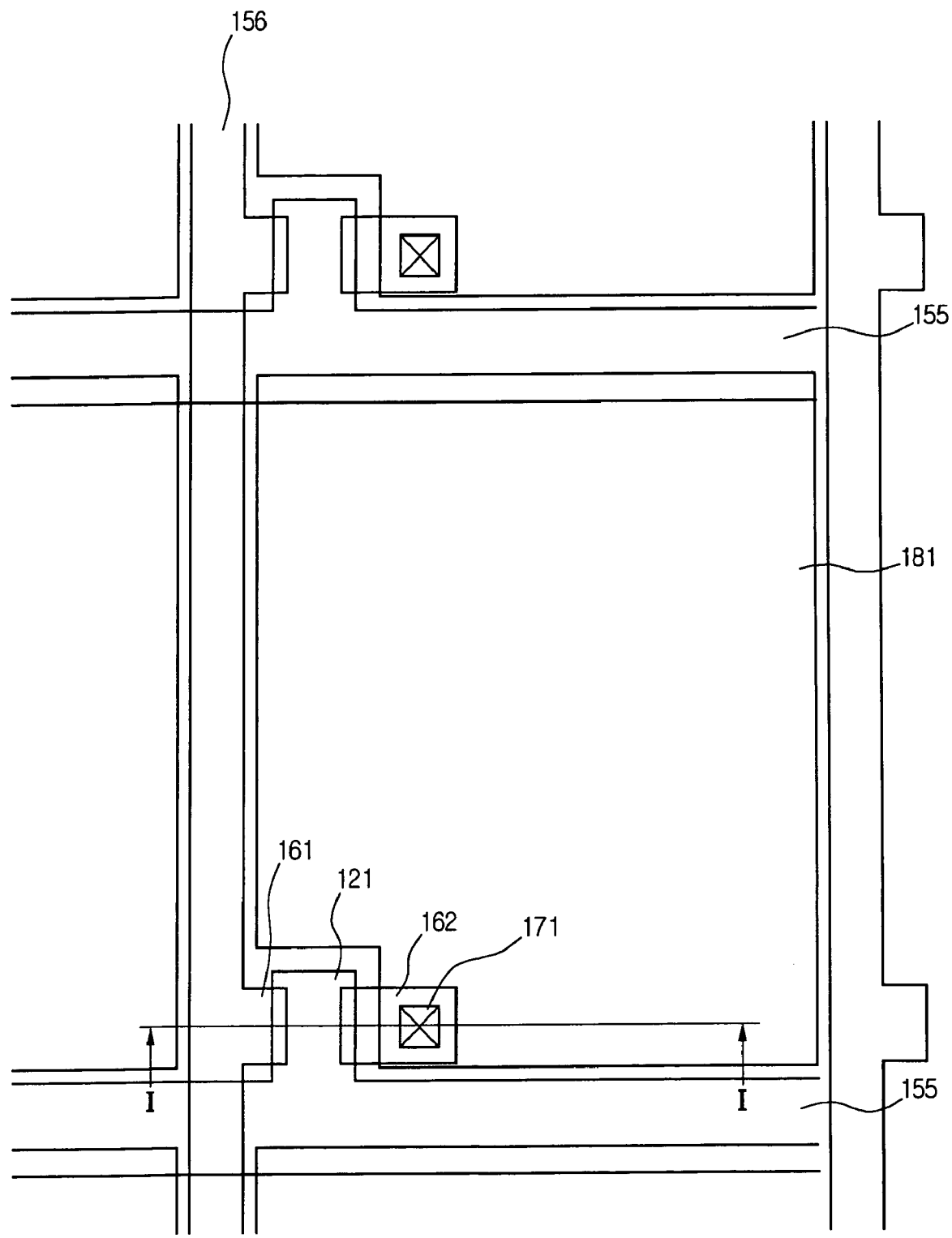
FIG. 1 is a plan view of a liquid crystal display according to the related art.
Figure 2:
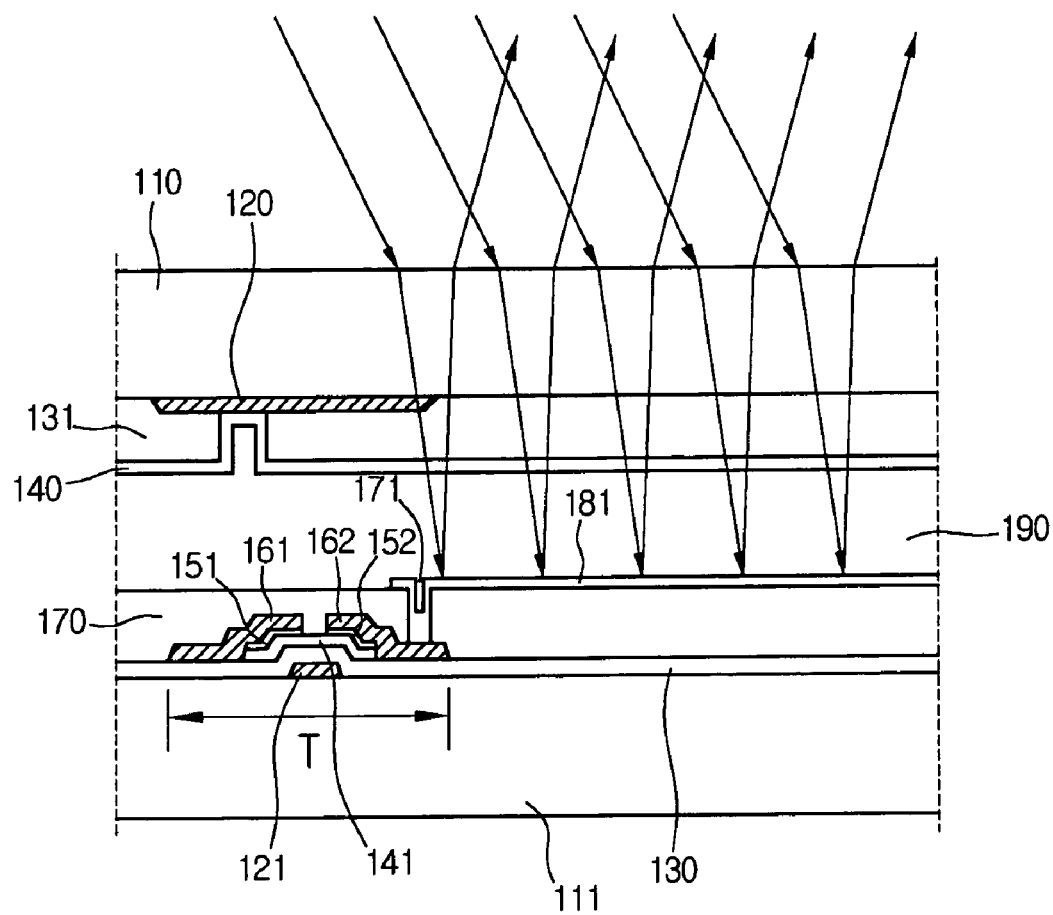
FIG. 2 is a sectional view taken along the line I—I of FIG. 1 and schematically shows a thin film transistor region of the liquid crystal display.
Figure 3:
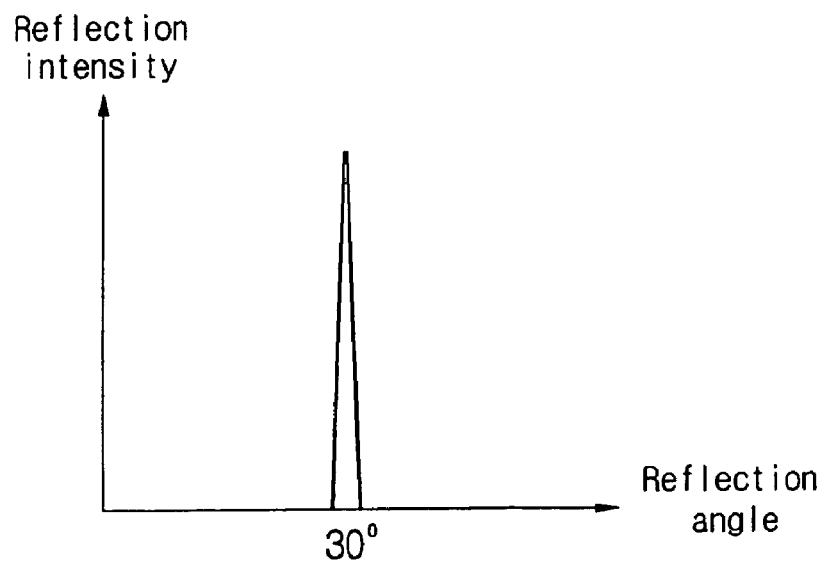
FIG. 3 is a graph illustrating the variation in reflection intensity versus the reflecting angle when a reflective plate is formed as a flat mirror without a scattering layer in the conventional LCD.
Figure 4:
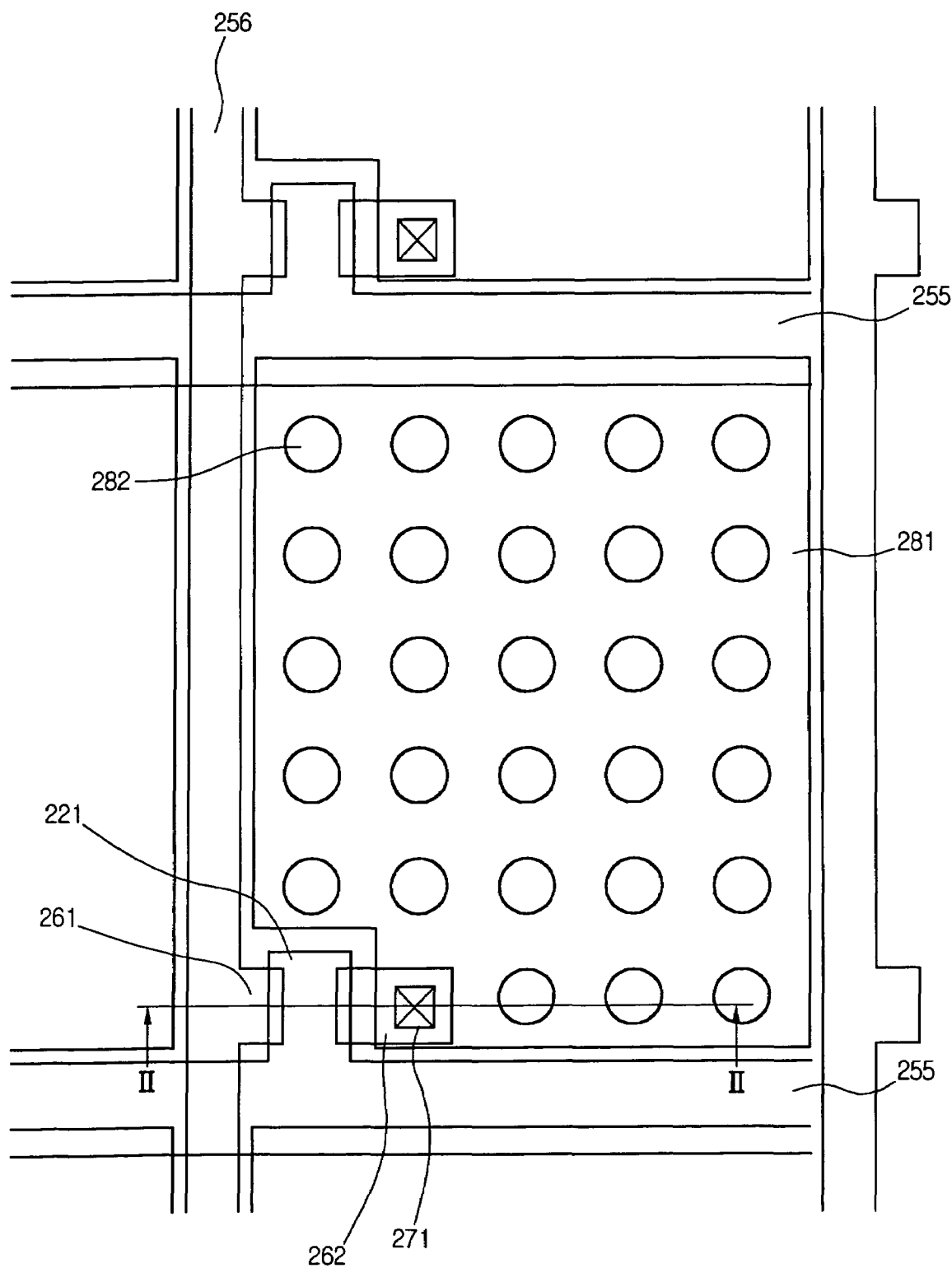
FIG. 4 is a schematic plan view of a reflective LCD having a reflective plate with a peak and depression structure.
Figure 5:
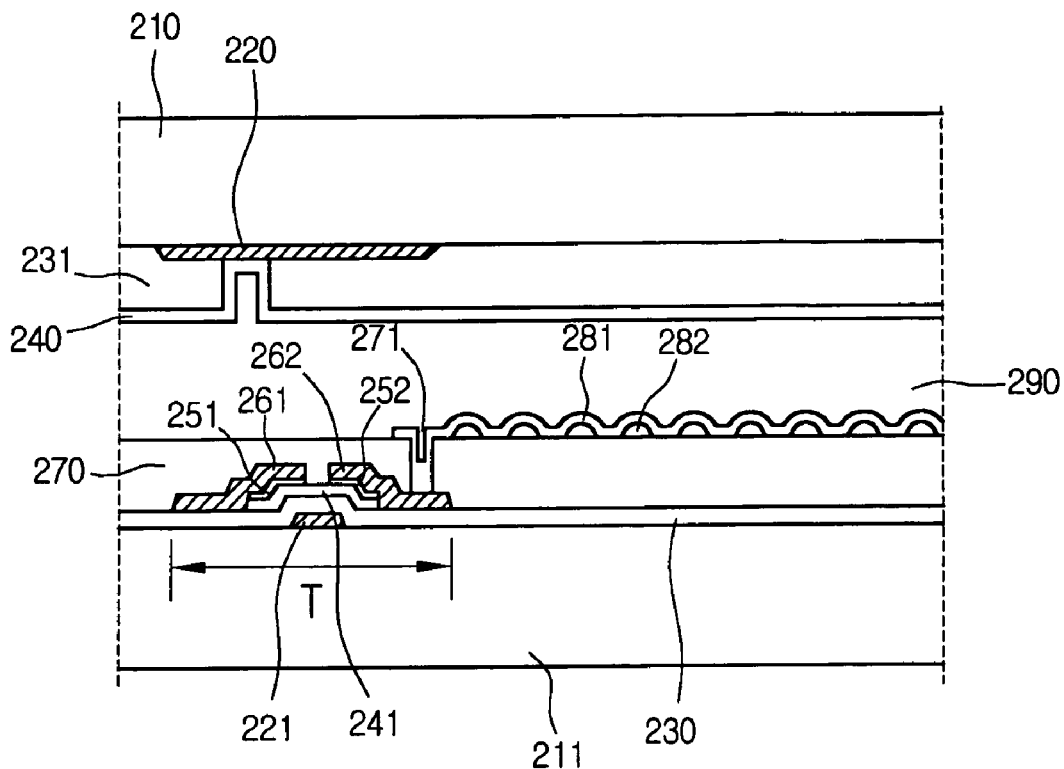
FIG. 5 is a sectional view taken along the line II—II of FIG. 4 and shows a thin film transistor region of the reflective LCD.
Figure 6:
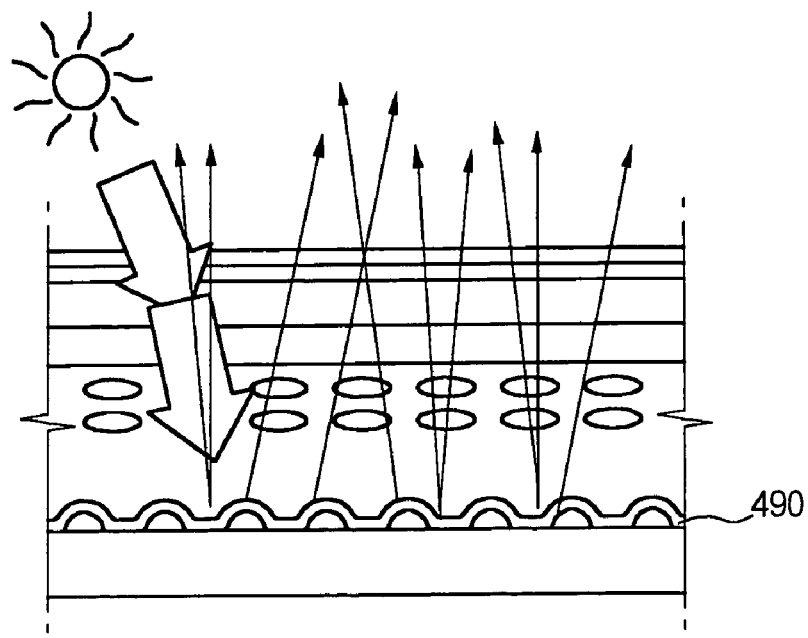
FIGS. 6 and 7 are schematic partial sectional views illustrating the light scattering effect in the reflective LCD that has a reflective plate with the peak and depression structure.
Figure 7:
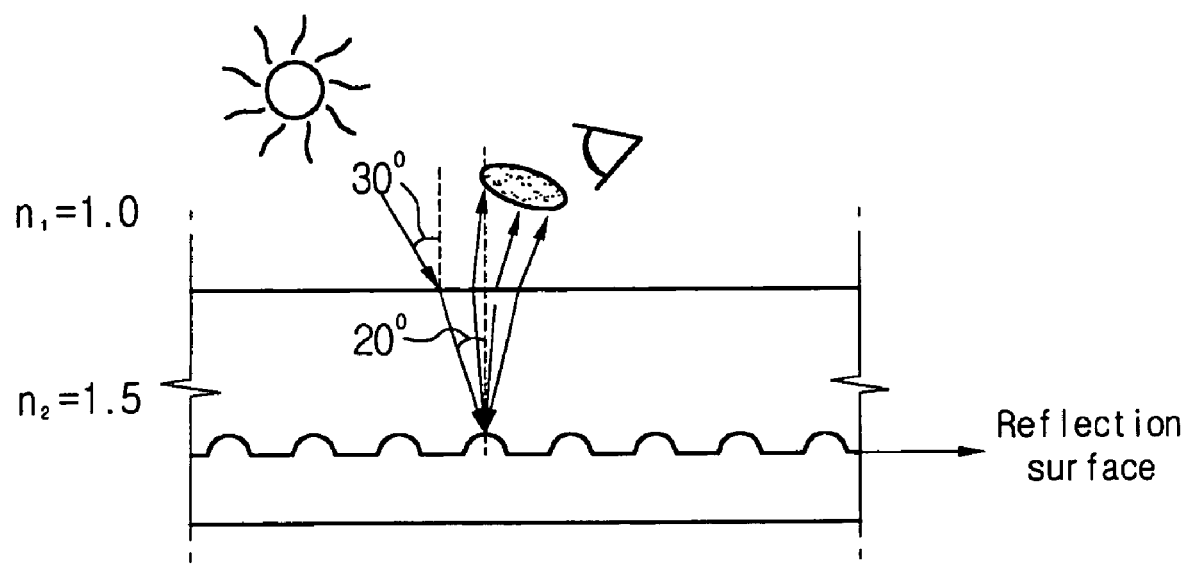
Figure 8A:
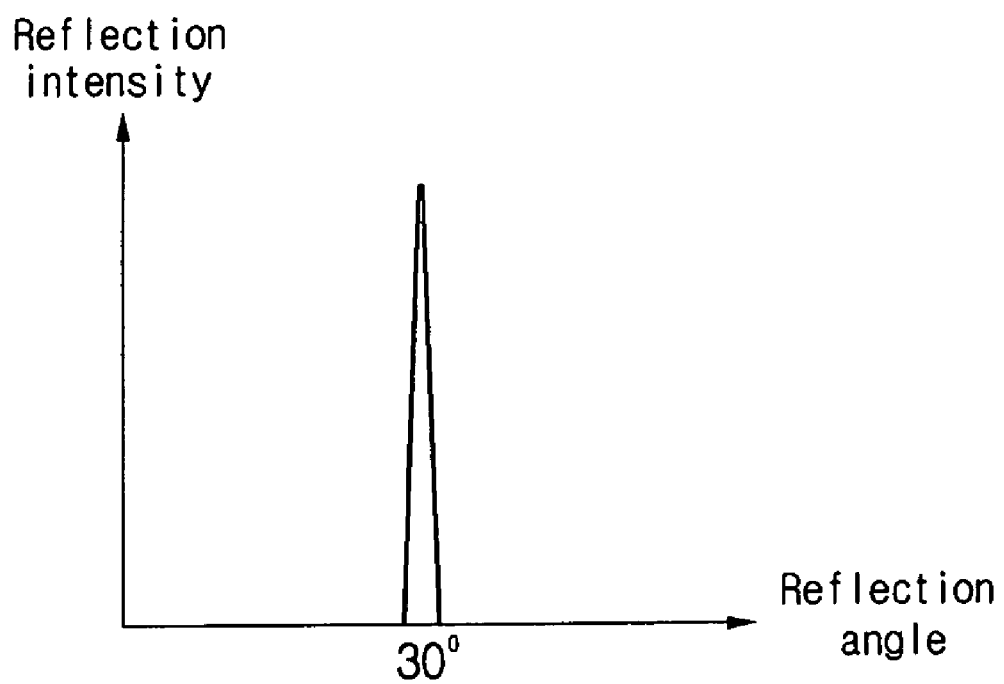
FIGS. 8A and 8B are a graph illustrating reflection intensity versus the reflection angle of the reflective LCD that has a conventional mirror type reflective plate and a graph illustrating reflection intensity versus the reflection angle of the reflective LCD that has a conventional reflecting surface with a peak and depression structure, respectively.
Figure 8B:
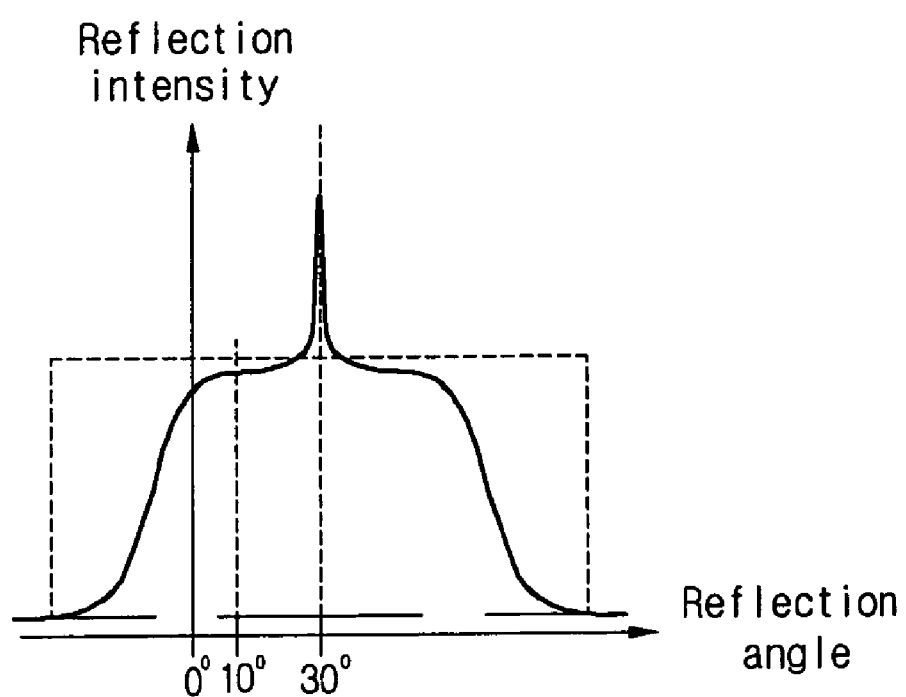
Figure 9A:
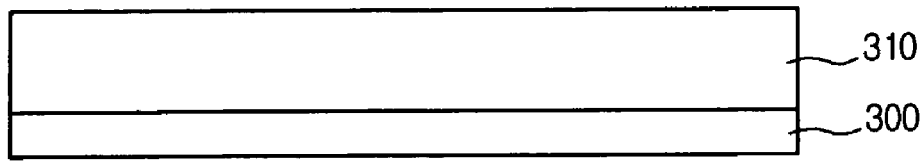
FIGS. 9A through 9D show schematically a peak and depression formation method using a one-layer process to form a reflective plate of a reflective LCD that has a conventional reflecting surface with the peak and depression structure.
Figure 9B:
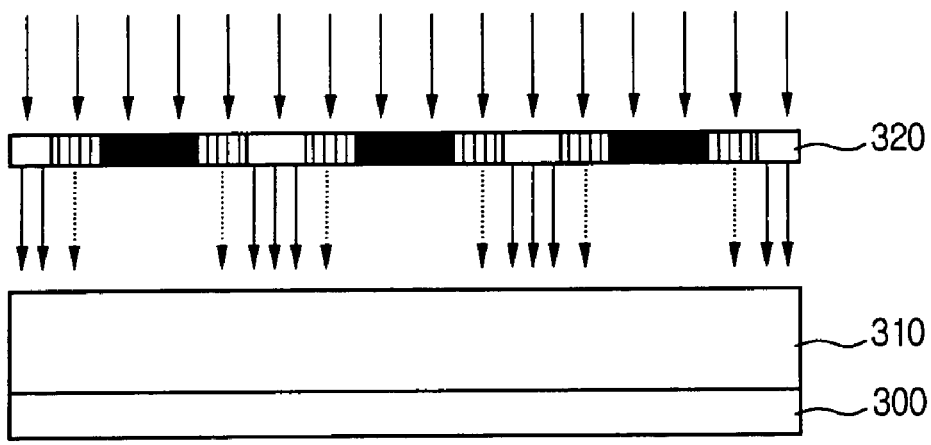
Figure 9C:
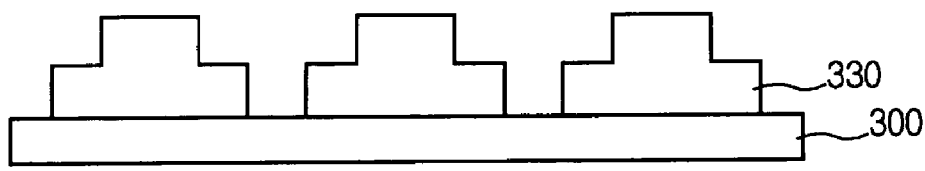
Figure 9D:
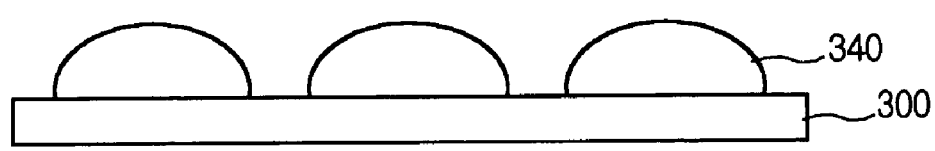
Figure 10A:
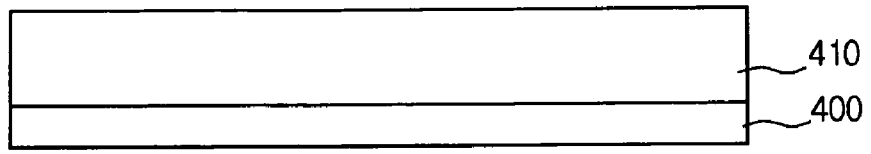
FIGS. 10A through 10E show schematically a peak and depression formation using a two-layer method to form a reflecting surface of a reflective LCD that has a conventional reflecting surface with the peak and depression structure.
Figure 10B:
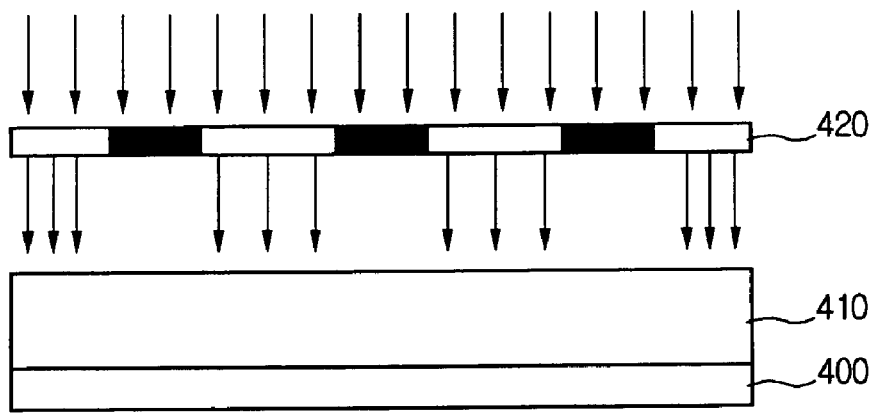
Figure 10C:
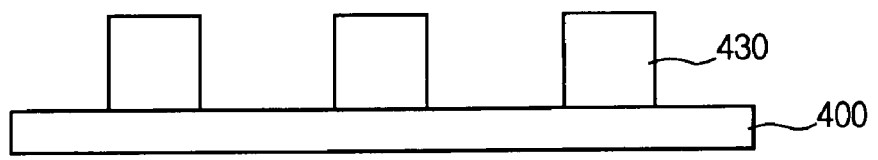
Figure 10D:
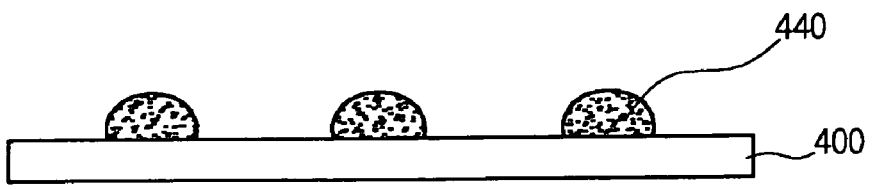
Figure 10E:
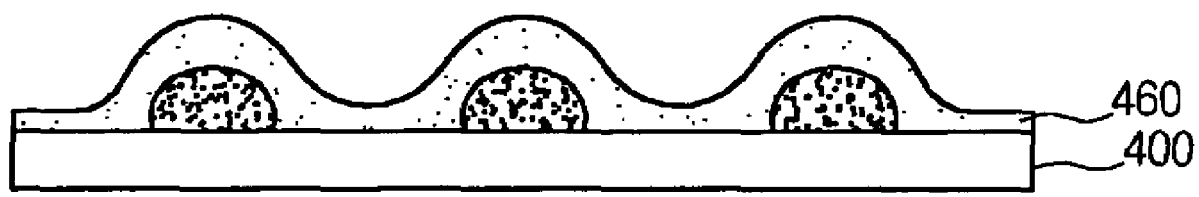
Figure 11:
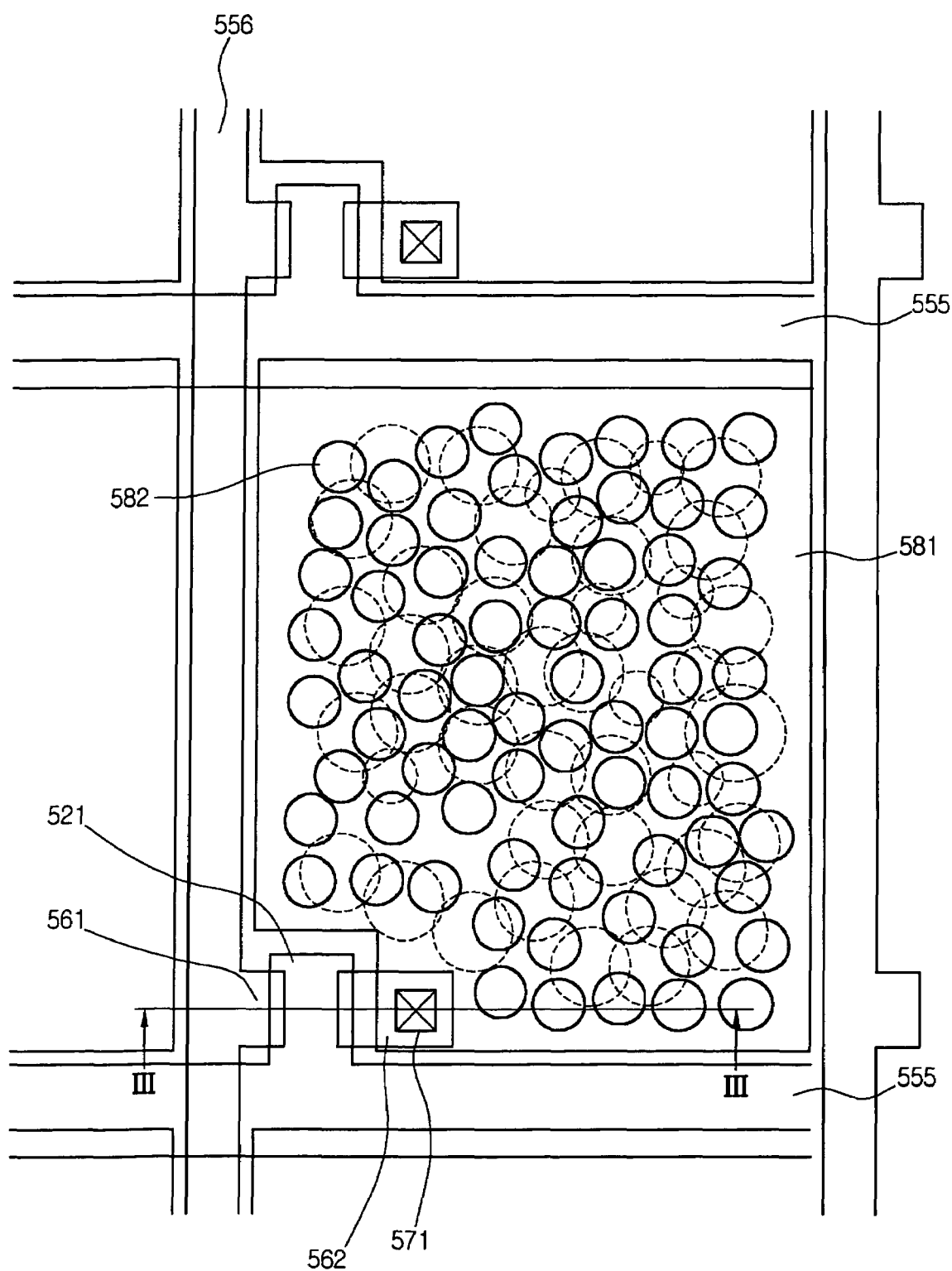
FIG. 11 is a plan view schematically showing a reflective liquid crystal display according to the present invention.
Figure 12:
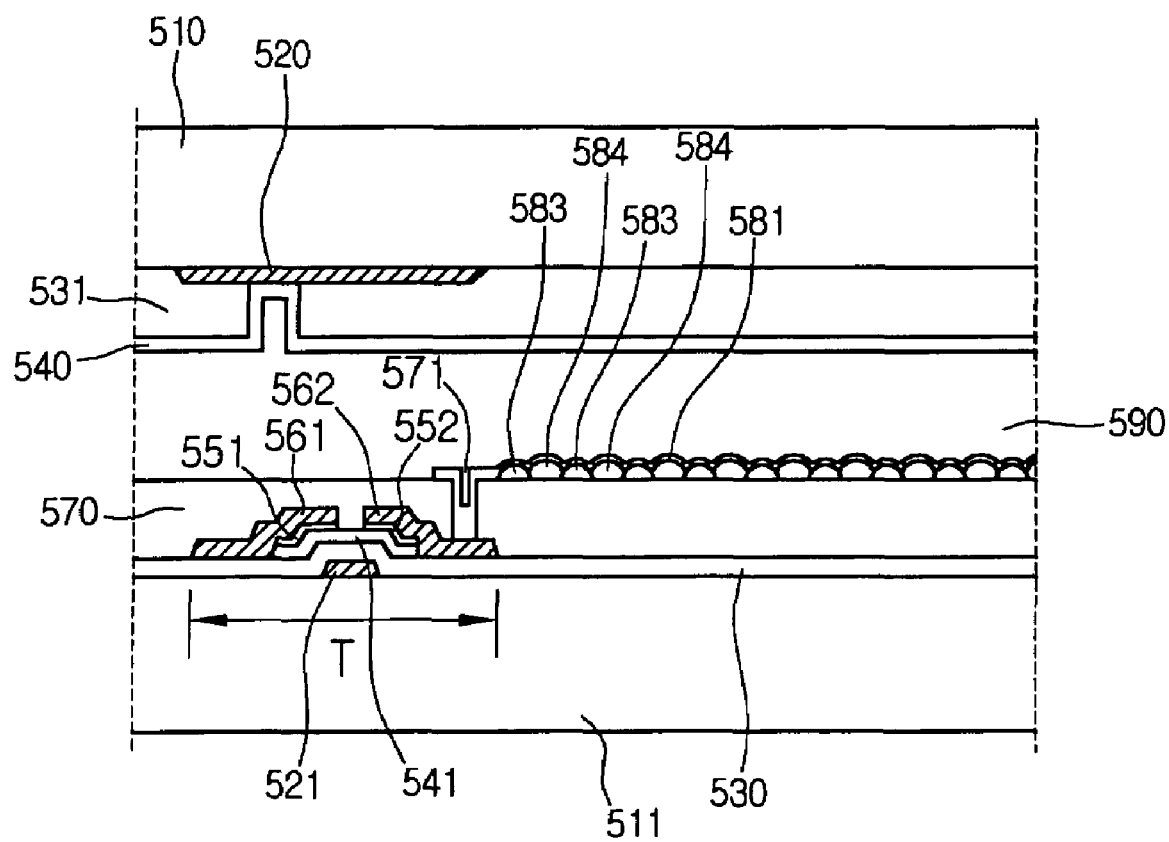
FIG. 12 is a sectional view taken along the line III—III of FIG. 11 and schematically shows a thin film transistor region of the liquid crystal display.

FIG. 11 is a plan view schematically showing a reflective liquid crystal display according to the present invention and FIG. 12 is a sectional view taken along the line III—III of FIG. 11 and schematically shows a thin film transistor region of the liquid crystal display.

In FIG. 11, a lower substrate provided with a thin film transistor and a pixel region is shown. In FIG. 12, a lower substrate is shown along with an upper substrate having a color filter. As previously mentioned, a lower substrate of a conventional reflective LCD includes a glass substrate 511, and a plurality of data lines 556 for applying data signals and a plurality of gate lines 555 arranged in a matrix configuration on the glass substrate 511. Regions defined by the crossing of the data lines 556 and the gate lines 555 correspond to pixel regions for displaying images. In a reflective LCD, a reflective plate 581 consisting of two layers each having a peak and depression structure 582 is formed.

As shown in FIG. 12, a gate electrode 521 of conductive material such as metal is formed on the transparent glass substrate 511. A gate insulating layer 530 of silicon nitride (SiNx) or silicon oxide (SiOx) covers the gate electrode 521. On the gate insulating layer 530 covering the gate electrode 521, an active layer 541 of amorphous silicon is formed. On the active layer 541, an ohmic contact layer 551, 552 of impurity-doped amorphous silicon is formed. On the ohmic contact layer 551, 552, source and drain electrodes 561 and 562 of conductive material such as metal are formed. The source and drain electrodes 561 and 562 form a thin film transistor (T) together with the gate electrode 521.

On the source and drain electrodes 561 and 562, a passivation layer 570 of silicon nitride (SiNx), silicon oxide (SiOx) or organic insulator is formed. The passivation layer 570 has a contact hole 571 exposing the drain electrode 562. The passivation layer 570 may be formed by sequentially depositing a first passivation film of SiNx or the like and a second passivation film of BCB or the like.

On the pixel region of the passivation layer 570, a reflective plate 581 of transparent conductive material is formed. The reflective plate 581 is connected with the drain electrode 562 through the contact hole 571 formed in the passivation layer 570. The reflective plate 581 also serves as the pixel electrode so as to display an image.

Although not shown in the drawings, on the reflective plate 581, an alignment layer of material such as polyimide aligned in a predetermined direction is formed.

The gate electrode 521 is connected with the gate line 555, and the source electrode 561 is connected with the data line 556. The gate line 555 is arranged substantially perpendicular with the data line 556 to define the pixel region.

Over the lower substrate having the aforementioned structure, an upper substrate is arranged at a predetermined distance. The upper substrate includes a black matrix 520 formed to correspond to the thin film transistor of the lower substrate, to prevent light from leaking in areas other than the pixel region.

Below the black matrix 520, a color filter 531 of red (R), green (G) and blue (B) is sequentially and repeatedly formed. In the color filter 531, one color corresponds to one pixel region. The color filter 531 may be formed by a dye method, a printing method, a pigment dispersion method, an electrodeposition method or the like. Afterwards, a common electrode 540 made of transparent conductive material is formed on the lower portion of the color filter 531. Although not shown in the drawings, below the common electrode 540, a second alignment layer made of material such as polyimide having an alignment surface aligned in a predetermined direction is formed.

In the general reflective LCD configured as described above, the light that is incident through the upper substrate passes through liquid crystal layer 590, is reflected by the reflecting surface, passes through the liquid crystal layer 590 and the upper substrate sequentially, and exits the LCD.

The structure of the reflecting surface formed in the pixel region will be described in brief. In a process for fabricating the peak and depression structure of reflecting surface, a first irregular layer 583 is formed on the substrate to a first thickness, such as approximately 1 µm, that is easy to control during its fabrication process. In the first peak and depression layer 583, the peaks may be formed to have a radius ranging from 7 µm to 15 µm corresponding to an height to radius ratio of 1:10.

Next, a second peak and depression layer 584 is formed on the first peak and depression layer such that the second peak patterns of the second peak and depression layer 584 are placed between the first peaks of the first peak and depression layer 583. The second peak and depression layer 584 may formed such that the height of the peak of the second peak and depression layer 584 is about half of the height of the first peaks of the first peak and depression layer 583 and about half of the radius of the first peak pattern.

Above, the terms of the first peak and depression layer 583 and the second peak and depression layer 584 are named because in the process forming the reflecting surface of the peak and depression structure, the first peaks are first randomly formed and the second peaks are secondly randomly formed.

In other words, as previously mentioned, forming the second peak and depression layer 584 on the reflecting surface is carried out to remain only the upper portion of the first peak pattern, 50% of the original height of the first peak pattern and to form the second peak and depression layer 584 at a height ranged from 1 µm to 1.5 µm along intervals between the first peak patterns of the first peak and depression layer 583 to maximize the density of the peaks in the reflective plate.

Also, because a sufficient distance is left between the first peaks of the first peak and depression layer 583, it may be possible to obtain a desired randomness. In addition, because the height and width of the shapes of the first and second peak and depression layers 583 and 584 are controllable to be different from each other, interference may be minimized at the maximum density.

After the first and second peak and depression layers 583 and 584 are formed, the reflective plate 581 serving as the pixel electrode is formed on the second peak and depression layer 584.

Figure 13:
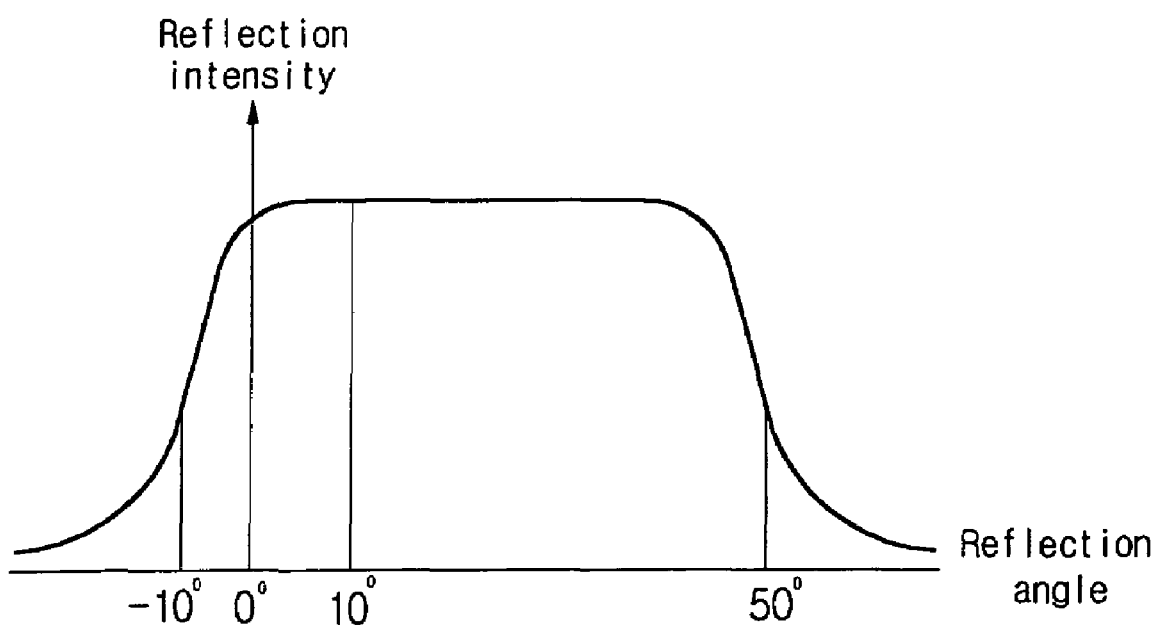
FIG. 13 is a graph showing reflection intensity values versus the reflection angles in a reflective LCD with a reflective plate having a peak and depression structure according to the present invention.

FIG. 13 is a graph showing reflection intensity values versus the reflection angles in a reflective LCD with a reflective plate having a peak and depression structure according to the present invention.

When light that is incident at an angle of −30°, uniform reflection intensity values are shown for angles ranging from −10° to 50°. The light that is incident on the LCD is refracted therein, is diffusively reflected with high efficiency by the reflecting surface of the peak and depression structure, and exits from the LCD. The output light shows uniform and high reflection intensity at reflection angles of 0–10° in front of the display that is the typical user location.

The characteristic of the graph depends on the peak and depression structure that allows incident light to be scattered at various angles. To enhance reflection efficiency and maximize the density of the peaks, the peak and depression structure of the reflective plate is formed by first randomly forming the first peak patterns and secondly randomly forming the second peak patterns between the first peaks.

Figure 14:
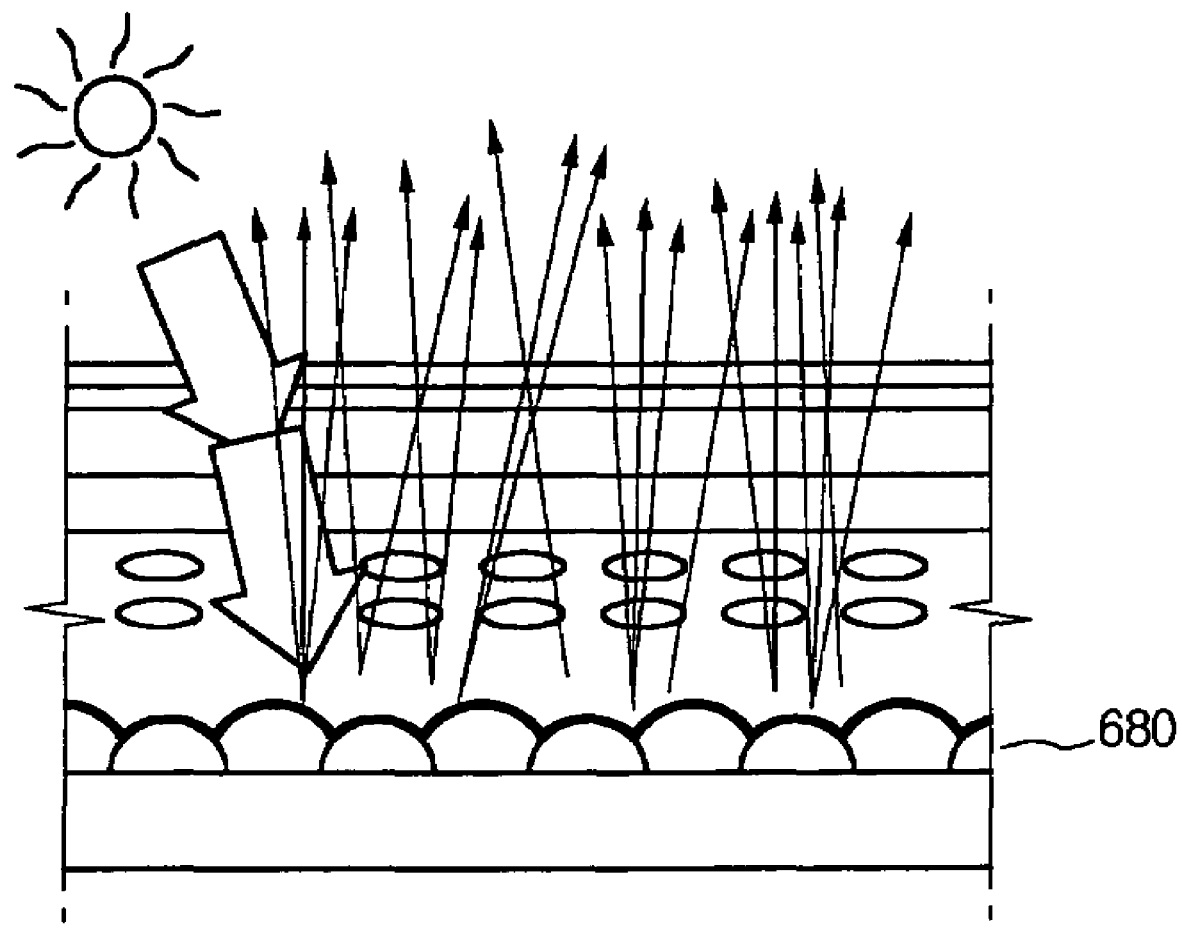
FIG. 14 is a partial sectional view illustrating the light scattering effect in a reflective LCD with a reflective plate having a peak and depression structure according to the present invention.

FIG. 14 is a partial sectional view illustrating the light scattering effect in a reflective LCD with a reflective plate having a peak and depression structure according to the present invention. When light is incident upon an LCD with an incident angle of about 30°, the light is refracted due to a refraction index difference between the liquid crystal layer (refractive index: 2) and air (refractive index: 1). The refracted light is reflected by the reflecting surface of the peak and depression structure and exits the LCD. The reflected light is not reflected in a specific direction but is diffusively reflected in various directions so that an improved reflection intensity may be obtained in front of the LCD that is the typical location of the user. In other words, in a viewing angle ranging from 0° to 10° with respect to the normal direction, the light that is incident upon the LCD is diffusively reflected off the reflective plate 680 to increase reflectivity.

FIGS. 15A to 15H are sectional views illustrating a process for forming a reflective plate in a reflective LCD with a peak and depression structure according to the present invention. Hereinafter, the height and radius of the peaks and the variety of methods used in the fabrication process as disclosed below serve as examples of the present invention. Other heights and radii as well as other fabrication methods may be use with the present invention.

Figure 15A:
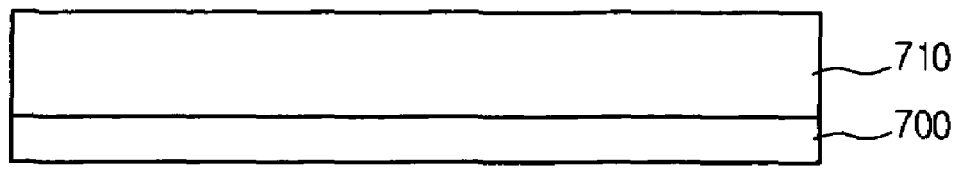
FIGS. 15A to 15H are sectional views illustrating a process for forming a reflective plate in a reflective LCD with a peak and depression structure according to the present invention.

Referring to FIG. 15A, first, a photosensitive resin film (for example, polymer resin) 710 is coated on a substrate 700 by a method such as a spin coating, a roll coating or the like so as to form a peak and depression structure. The photosensitive resin film 710 is formed with a thickness of about 1 μm which thickness may be controlled in forming a first peak and depression layer.

Figure 15B:
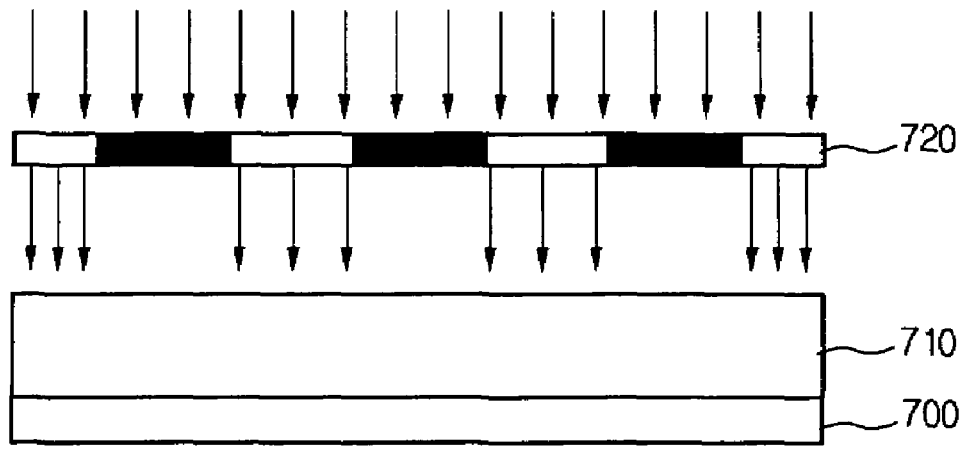
Figure 15C:
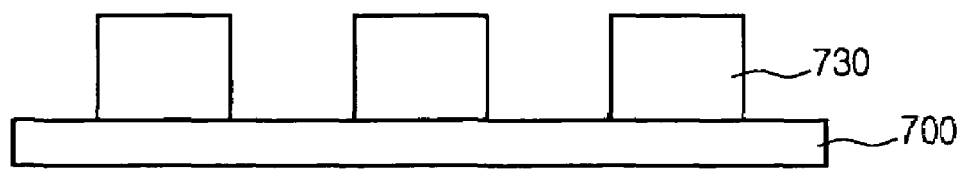

As shown in FIG. 15B, a first mask 720 with a plurality of holes is aligned with the photosensitive resin film 710 and ultraviolet rays (denoted by arrows in the drawings) are irradiated onto the photosensitive resin film 710 to form a peak and depression pattern. The hole pattern of the first mask 720 is designed such that peaks are randomly arranged on the peak and depression structure in the pixel region.

After the irradiation of the ultraviolet rays, a developing process is carried out, so that a plurality of peak patterns (first peak pattern) 730 corresponding to the shapes of the slits formed in the first mask 720 are formed on a substrate 700. The photosensitive resin film 710 in the present example is formed at the thickness of about 1 μm, so the radii of the peak patterns are formed to have a value of about 10 μm in accordance with an ideal ratio of height to radius of 10 to 1.

Figure 15D:

Through a curing and baking process, the plurality of peaks 730 of the photosensitive resin film is softened to form a hemi-spherical peak pattern 740 as shown in FIG. 15D. Alternatively, the peaks 730 may be formed at different heights.

Figure 15E:
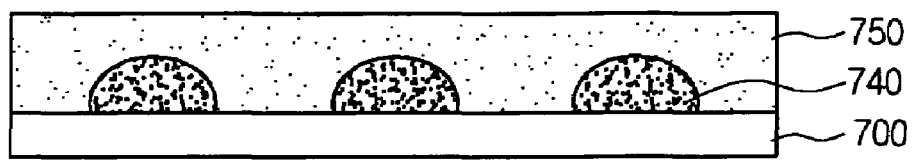

Next, as shown in FIG. 15E, a photo acryl film 750 is coated on the hemi-spherical peak pattern 740 and the substrate 700 by a spin coating, a roll coating, or the like at a thickness ranging from 1 μm to 1.5 μm.

Figure 15F:
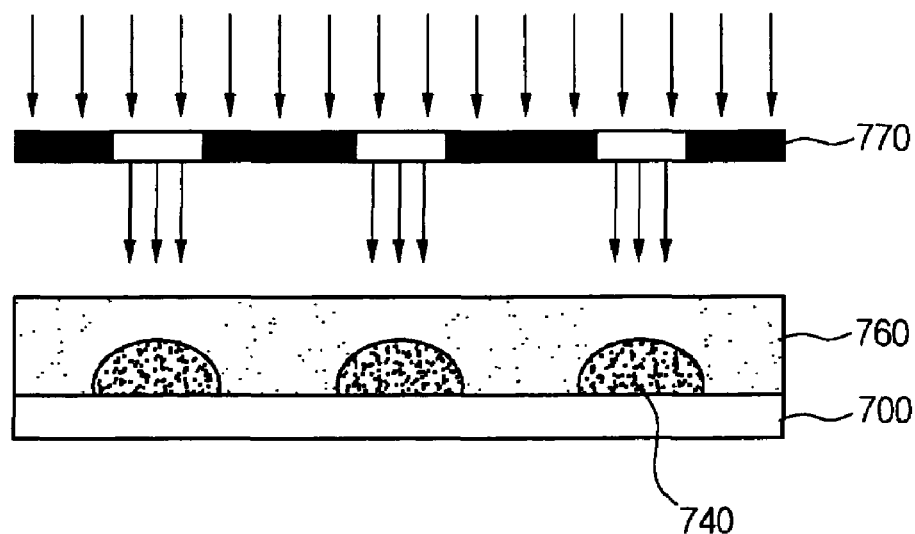
Figure 15G:
Figure 15H:
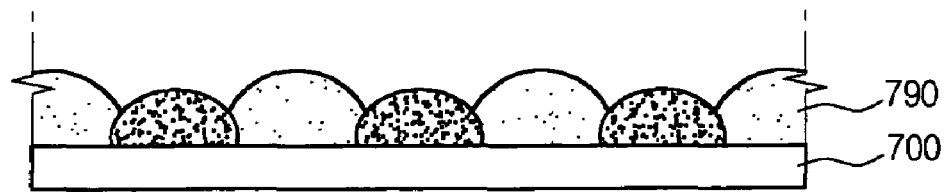

Afterwards, as shown in FIG. 15F, a second mask 770 with a plurality of holes is aligned with the photo acryl film 750 and ultraviolet rays (denoted by arrows on the drawings) are irradiated onto the photo acryl film 750 to form a peak and depression pattern. The hole patterns of the second mask 770 are designed to form a plurality of peaks between the first peak patterns 740. Thereafter, through a developing process, a plurality of acryl peak patterns 780 corresponding to the holes of the second mask 770 are formed between the first peak patterns 740 as shown in FIG. 15G. Lastly, through a melt baking, the plurality of acryl peak patterns 780 are softened to form a second hemi-spherical peak pattern 790. In forming the second peak patterns 790 between the first peak patterns, the second peak patterns 790 are formed to leave the upper 50% of the height of the first peak pattern exposed and to cover the remaining portion.

After the two layers of the hemi-spherical peak patterns 740 and 790 are formed, a reflective plate (not shown) serving as a pixel electrode is formed thereon.

By forming the first peak and depression layer and the second peak and depression layer as described above, it is possible to maximize the density of the peaks. Also, by forming the second peak patterns on the reflecting surface between the first peak patterns, may a high reflection intensity in a specific direction be prevented, and a sufficient interval may be secured between the first peak patterns to obtain a desired randomness while forming the peaks. In addition, because it is possible to control the shapes of the first and second peaks, the interference influence of light may be minimized at a maximum density of the peaks.

While the above embodiment shows and describes a fabrication process using masks each having a light transmission region and a light reflecting region, the invention may use a diffraction mask or semi-transmission mask.

Figure 16A:
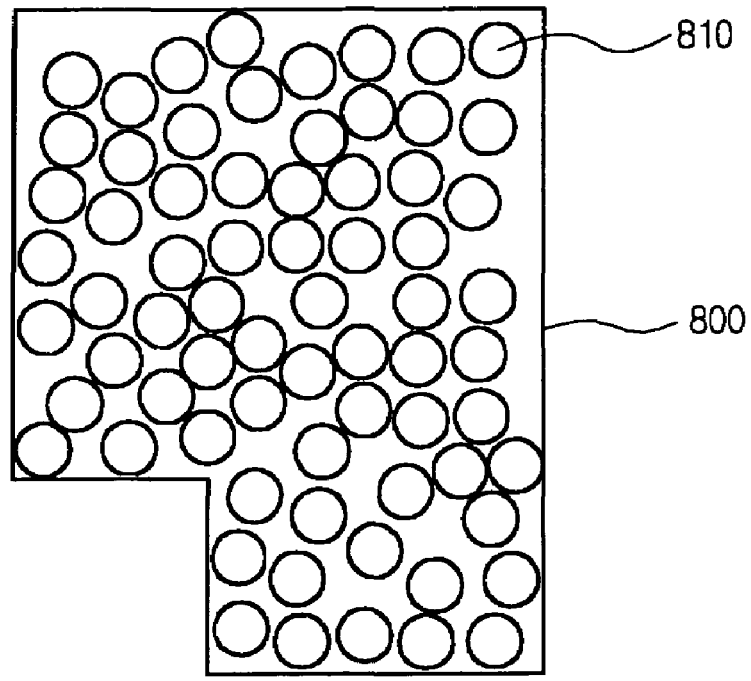
FIGS. 16A and 16B are plan views illustrating the structures of reflective plates formed in a pixel region in a reflective LCD with a reflective plate having a peak and depression structure according to the present invention.
Figure 16B:
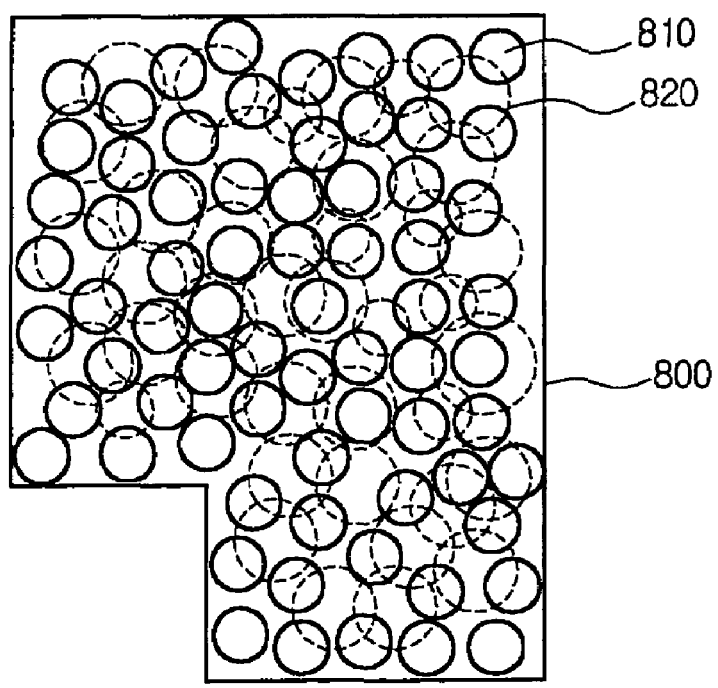

FIGS. 16A and 16B are plan views illustrating the structures of reflective plates formed in a pixel region in a reflective LCD with a reflective plate having a peak and depression structure according to the present invention. FIG. 16A shows a reflective plate in which a first peak and depression layer 810 is formed on a pixel region, and FIG. 16B shows the final shape of the reflective plate in which peak patterns of a second peak and depression layer 820 are formed between the first peak patterns of the first peak and depression layer 810.

In FIG. 16A, the first peak patterns of the first peak and depression layer 810 are randomly formed so as to prevent the reflectivity from being lowered as when they are formed regularly.

Next, as shown in FIG. 16B, the second peak patterns of the second peak and depression layer 820 denoted by a dotted line are formed between the first peak patterns of the first peak and depression layer 810 denoted by a solid line.

By forming the first and second peak patterns as described above, the reflecting surface of the reflective plate formed on the pixel region of the LCD also has a peak and depression structure corresponding to the first and second peak patterns. Hence, light that is incident upon the LCD is diffusively reflected by the peak and depression of the reflecting surface so that reflectivity is enhanced over a range of viewing angles to improve the reflection intensity for a user.

In an LCD with the reflective plate of the present invention, by forming the first peak and depression layer in a random configuration and forming the second peaks of the second peak and depression layer between the first peaks of the first peak and depression layer, it is possible to maximize the density of the peaks in the reflective plate. Also, forming the second peak patterns at a reflecting surface portion between the first peaks of the first peak and depression layer prevents a high reflection intensity only in a specific direction, so that light that is reflected by the reflective plate is not reflected only in a specific direction but is diffusively reflected in various directions. As a result, an improved reflection intensity in front of the LCD my be obtained.

Further, because it is possible to secure a sufficient interval between the first peaks of the first peak and depression layer, a desired randomness may be obtained. Also, because the first and second peak and depression layers may be different shapes, the light interference influence may be minimized at the maximum density of the peaks, so that light efficiency and reflection efficiency of the reflective plate may be enhanced.

Furthermore, because the invention uses a patterning method to form the structure of the first and second peak and depression layers of the reflecting surface in a reflective LCD or a transflective LCD, the peak structure may be stably formed with a repeatable fabrication method.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for fabricating a reflective plate used in a liquid crystal display comprising:
   depositing a first organic insulating layer on a substrate;
   forming a plurality of first peak patterns having a predetermined distance from the first organic insulating layer by using a first mask;
   depositing a second organic insulating layer on the substrate including the first peak patterns;
   forming a plurality of second peak patterns between the first peak patterns from the second organic insulating layer by using a second mask; and
   forming a reflective electrode on the first and second peak patterns;
   wherein the second peak patterns have a different height from the first peak patterns, and overlap only a portion of the adjacent first peak pattern.

2. The method according to claim 1, wherein the first and second peak patterns are softened by a curing bake process to form a plurality of peak patterns.

3. The method according to claim 1, wherein each of the first peak patterns comprises a plurality of first peaks and each of the second peak pattern comprises a plurality of second peaks, wherein a highest point of each of the first peaks is located at different locations from a highest point of each of the second peaks.

4. The method according to claim 1, wherein each of the first peak patterns comprises a plurality of first peaks and each of the second peak pattern comprises a plurality of second peaks, wherein a center of each of the first peaks is located at different locations from a center of each of the second peaks.

5. The method according to claim 1, wherein the first and second organic insulating layers are photosensitive resin.

6. The method according to claim 1, wherein the first mask comprises a light transmission portion and a light reflecting portion.

7. The method according to claim 1, wherein the second mask comprises a light transmission portion and a light reflecting portion.

8. The method according to claim 1, wherein the first mask is one of a transflective mask and a diffraction mask.

9. The method according to claim 1, wherein the second mask is one of a transflective mask and a diffraction mask.

10. The method according to claim 1, wherein the first and second peak patterns have a plurality of peaks that are randomly arranged.

11. The method according to claim 1, wherein each of the first peak patterns comprises a plurality of first peaks and each of the second peak pattern comprises a plurality of second peak overlapped with the first peaks.

12. The method according to claim 1, wherein each of the first peak patterns comprises a plurality of first peaks and each of the second peak pattern comprises a plurality of second peaks overlapped with portions of the first peaks with a height less than one half height of the first peaks.

13. The method according to claim 1, wherein a reflecting surface formed by the first and second peak patterns has final peak shapes in which a ratio of a height to a radius of the peak is 1:10.

14. The method according to claim 1, wherein the second peak patterns between the first peak patterns directly contacts the substrate.

* * * * *